United States Patent
Kella et al.

(10) Patent No.: US 8,989,754 B2
(45) Date of Patent: Mar. 24, 2015

(54) SYSTEMS AND METHOD FOR BT AMP AND WLAN CONCURRENCY

(71) Applicant: QUALCOMM Incorporated, San Diego, CA (US)

(72) Inventors: Leela Prasad Kella, Chennai (IN); Imran Ansari, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 13/767,805

(22) Filed: Feb. 14, 2013

(65) Prior Publication Data

US 2014/0228038 A1   Aug. 14, 2014

(51) Int. Cl.
  *H04W 88/06* (2009.01)
  *H04W 72/12* (2009.01)
  *H04W 48/18* (2009.01)

(52) U.S. Cl.
  CPC .......... *H04W 88/06* (2013.01); *H04W 72/1215* (2013.01); *H04W 48/18* (2013.01)
  USPC ...... 455/450; 455/41.1; 455/41.2; 455/552.1; 455/553.1

(58) Field of Classification Search
  CPC ..... H04W 36/04; H04W 84/06; H04W 16/32; H04W 84/18; H04W 52/02; H04W 88/06; G06K 19/0723
  USPC ............ 370/311; 455/450, 444, 428, 41.1–2, 455/550.1, 552.1, 553.1
  See application file for complete search history.

(56) References Cited

U.S. PATENT DOCUMENTS

| | | | |
|---|---|---|---|
| 7,233,602 B2 | 6/2007 | Chen et al. | |
| 2008/0311852 A1 | 12/2008 | Hansen et al. | |
| 2009/0034498 A1 | 2/2009 | Banerjea et al. | |
| 2009/0198859 A1* | 8/2009 | Orishko et al. | 710/313 |
| 2010/0009632 A1 | 1/2010 | Ibrahim et al. | |
| 2010/0009725 A1 | 1/2010 | Banerjea | |
| 2010/0130138 A1 | 5/2010 | Nandagopalan et al. | |
| 2010/0173621 A1 | 7/2010 | Hillan | |
| 2013/0052955 A1* | 2/2013 | Tamura | 455/41.2 |
| 2014/0119252 A1* | 5/2014 | Kella et al. | 370/311 |

OTHER PUBLICATIONS

International Search Report and Written Opinion—PCT/US2014/015719—ISA/EPO—May 21, 2014.
"Specification of the Bluetooth System, Core v4.0, vol. 1", Jun. 30, 2010, pp. 107-243, XP55016506, Retrieved from the Internet: URL:www.google.com [retrieved on Jan. 13, 2012] paragraph [3.3.2.1.2].

* cited by examiner

*Primary Examiner* — Cong Tran
(74) *Attorney, Agent, or Firm* — Bay Area Technology Law Group PC

(57) ABSTRACT

Systems and methods are disclosed for coordinating operation of WLAN and Bluetooth systems to manage an AMP connection based on an operational status of the WLAN transceiver.

32 Claims, 4 Drawing Sheets

SYSTEMS AND METHOD FOR BT AMP AND WLAN CONCURRENCY

FIELD OF THE PRESENT INVENTION

This disclosure generally relates to wireless communication systems and more specifically to systems and methods for managing coexistence between multiple wireless protocols.

BACKGROUND OF THE INVENTION

The recent proliferation of devices employing wireless technologies has led to the increasing availability of devices featuring multiple wireless communication systems. BLUETOOTH® (Bluetooth) is often used to connect and exchange information between mobile phones, computers, digital cameras, wireless headsets, speakers, keyboards, mice or other input peripherals, and similar devices over relatively short distances. Bluetooth offers a number of advantages, including high interoperability and power efficiency, but may exhibit reduced data transfer rates as compared to other wireless communications systems. For example, a wireless local area network (WLAN), such as one conforming to the 802.11 family of standards promulgated by the Institute of Electrical and Electronics Engineers (IEEE), may offer relatively high data rates over relatively long distances, offering an easy interface to existing network infrastructures. Accordingly, it may be desirable to provide wireless communications between devices using a system that shares attributes of the Bluetooth and WLAN technologies.

To help achieve this goal, the high speed extensions in the Bluetooth 3.0 specification enable two devices having WLAN capabilities that have a conventional Bluetooth link to establish an additional communications link using their respective WLAN transceivers. Specifically, packets of Bluetooth information may be routed through the media access control (MAC) layers and physical (PHY) layers of each WLAN transceiver for transmission and reception. Accordingly, this type of communications may be termed a Bluetooth Alternate MAC/PHY (AMP) link and allows the Bluetooth system to selectively provide information transfer at the increased rates associated with WLAN protocols.

Despite these benefits, using the same transceiver for both WLAN and Bluetooth communications may create concurrency problems. For example, in normal operation the WLAN undergoes a scanning and roaming procedure during which it may change channels or frequencies. If there is an active AMP link on a given channel, concurrent operation may not be allowed as soon as the WLAN connection roams away from the current channel. Accordingly, it would be desirable to provide systems and methods for coordinating operation of the WLAN and AMP links. This disclosure satisfies these and other needs.

SUMMARY OF THE INVENTION

This disclosure involves systems for wireless communication, and may include a wireless communication device with a Bluetooth transceiver, a wireless local area network (WLAN) transceiver having a protocol adaptation layer (PAL) supporting Bluetooth alternate media access control/physical layer (AMP) link, a Bluetooth host that communicates with the WLAN transceiver through the PAL, and a reporter that may send information regarding a WLAN operational status of the WLAN transceiver to the Bluetooth host, such that the Bluetooth host may operate an AMP link on the basis of the operational status information. The operational status information may be an AMP_Status_Change message sent by the reporter to the Bluetooth host.

In one aspect, the AMP_Status_Change message may have a first value, which may indicate the WLAN transceiver has no AMP capacity, and the Bluetooth host may disconnect the AMP link upon receipt of the AMP_Status_Change message. Further, the Bluetooth host may route Bluetooth traffic to the Bluetooth transceiver after the AMP link is disconnected.

In another aspect, the AMP_Status_Change message may have a second value, which may indicate the WLAN transceiver has medium AMP capacity, and the Bluetooth host may establish the AMP link over a channel being employed by the WLAN transceiver upon receipt of the AMP_Status_Change message.

Further, the reporter may send a first AMP_Status_Change message with the first value based on an impending channel switch for the WLAN transceiver and may send a second AMP_Status_Change message with a second value when the WLAN transceiver switches to a new channel, the second value may indicate the WLAN transceiver has medium AMP capacity, and the Bluetooth host may establish an AMP link over the new channel upon receipt of the second AMP_Status_Change message.

In another aspect, the AMP_Status_Change message may have a third value, which may indicate the WLAN transceiver has high AMP capacity, and the Bluetooth host may establish the AMP link upon receipt of the AMP_Status_Change message.

In yet another aspect, the AMP_Status_Change message may have a fourth value, which may indicate the WLAN transceiver has a predefined AMP capacity, and the Bluetooth host may adjust the AMP link upon receipt of the AMP_Status_Change message.

This disclosure also includes methods for wireless communications employing a device having Bluetooth and WLAN capabilities. In one aspect, a suitable method may include the steps of determining information regarding an operational status of a WLAN transceiver of the device, reporting the information to a Bluetooth host of the device through a PAL of the WLAN transceiver, and operating a Bluetooth AMP link based on the information. The operational status information may be an AMP_Status_Change message sent by the reporter to the Bluetooth host.

In one aspect, the AMP_Status_Change message may have a first value, which may indicate the WLAN transceiver has no AMP capacity, and operating the AMP link may include disconnecting the AMP link. Further, Bluetooth traffic may be routed to the Bluetooth transceiver after the AMP link is disconnected.

In another aspect, the AMP_Status_Change message may have a second value, which may indicate the WLAN transceiver has medium AMP capacity, and operating the AMP link may include establishing the AMP link over a channel being employed by the WLAN transceiver.

Further, a first AMP_Status_Change message with the first value may be reported based on an impending channel switch for the WLAN transceiver and a second AMP_Status_Change message with a second value may be reported when the WLAN transceiver switches to a new channel, the second value may indicate the WLAN transceiver has medium AMP capacity, and operating the AMP link may include establishing an AMP link over the new channel.

In another aspect, the AMP_Status_Change message may have a third value, which may indicate the WLAN transceiver has high AMP capacity, and operating the AMP link may include establishing the AMP link.

In yet another aspect, the AMP_Status_Change message may have a fourth value, which may indicate the WLAN transceiver has a predefined AMP capacity, and operating the AMP link may include adjusting the AMP link.

This disclosure also involves a non-transitory processor-readable storage medium for operating a wireless communications device having Bluetooth and WLAN capabilities, the processor-readable storage medium may have instructions including code for determining information regarding an operational status of a WLAN transceiver of the device, code for reporting the information to a Bluetooth host of the device through a PAL of the WLAN transceiver, and code for operating a Bluetooth AMP link based on the information. The operational status information may be an AMP_Status_Change message sent by the reporter to the Bluetooth host.

In one aspect, the AMP_Status_Change message may have a first value, which may indicate the WLAN transceiver has no AMP capacity, and the code for operating the AMP link may include code for disconnecting the AMP link. Further, the storage medium may include code for routing Bluetooth traffic through the Bluetooth transceiver after the AMP link is disconnected.

In another aspect, the AMP_Status_Change message may have a second value, which may indicate the WLAN transceiver has medium AMP capacity, and the code for operating the AMP link may include code for establishing the AMP link over a channel being employed by the WLAN transceiver.

Further, the code for reporting the information regarding the operational status may include code for reporting a first AMP_Status_Change message with the first value based on an impending channel switch for the WLAN transceiver and for reporting a second AMP_Status_Change message with a second value when the WLAN transceiver switches to a new channel, the second value may indicate the WLAN transceiver has medium AMP capacity, and the code for operating the AMP link may include code for establishing an AMP link over the new channel.

In another aspect, the AMP_Status_Change message may have a third value, which may indicate the WLAN transceiver has high AMP capacity, and the code for operating the AMP link may include code for establishing the AMP link.

In yet another aspect, the AMP_Status_Change message may have a fourth value, which may indicate the WLAN transceiver has a predefined AMP capacity, and the code for operating the AMP link may include code for adjusting the AMP link.

This disclosure also includes embodiments in which the wireless communication device has a Bluetooth transceiver, a WLAN transceiver including a PAL to support a Bluetooth AMP link, means for operating an AMP link in communication with the WLAN transceiver through the PAL, and means for reporting information regarding a WLAN operational status of the WLAN transceiver to the means for operating the AMP link, wherein the means for operating the AMP link to operate the AMP link on the basis of the operational status information. The operational status information may be an AMP_Status_Change message sent by the means for reporting information to the means for operating the AMP link.

In one aspect, the AMP_Status_Change message may have a first value, which may indicate the WLAN transceiver has no AMP capacity, and the means for operating the AMP link may disconnect the AMP link upon receipt of the AMP_Status_Change message. Further, the means for operating the AMP link may route Bluetooth traffic to the Bluetooth transceiver after the AMP link is disconnected.

In another aspect, the AMP_Status_Change message may have a second value, which may indicate the WLAN transceiver has medium AMP capacity, and the means for operating the AMP link may establish the AMP link over a channel being employed by the WLAN transceiver upon receipt of the AMP_Status_Change message.

Further, the means for reporting information may send a first AMP_Status_Change message with the first value based on an impending channel switch for the WLAN transceiver and may send a second AMP_Status_Change message with a second value when the WLAN transceiver switches to a new channel, the second value may indicate the WLAN transceiver has medium AMP capacity, and the means for operating the AMP link may establish an AMP link over the new channel upon receipt of the second AMP_Status_Change message.

In another aspect, the AMP_Status_Change message may have a third value, which may indicate the WLAN transceiver has high AMP capacity, and the means for operating the AMP link may establish the AMP link upon receipt of the AMP_Status_Change message.

In yet another aspect, the AMP_Status_Change message may have a fourth value, which may indicate the WLAN transceiver has a predefined AMP capacity, and the means for operating the AMP link may adjust the AMP link upon receipt of the AMP_Status_Change message.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Figure 1:
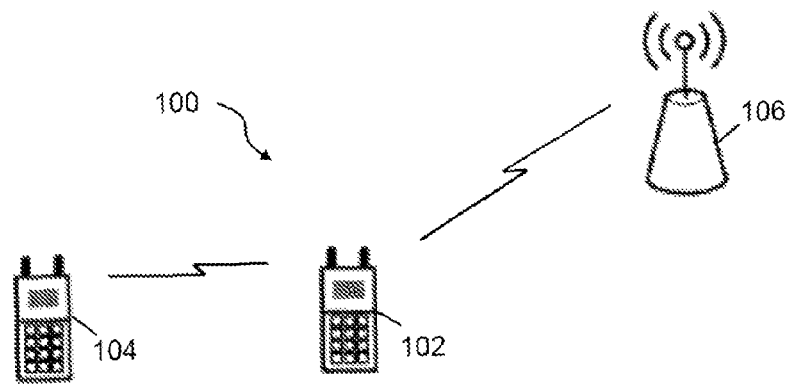
FIG. 1 schematically depicts a wireless environment including a wireless communications device supporting WLAN and Bluetooth AMP links, according to one embodiment of the invention.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the invention in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Embodiments are described herein with regard to a wireless communications device, which may include any suitable type of user equipment, such as a system, subscriber unit, subscriber station, mobile station, mobile wireless terminal, mobile device, node, device, remote station, remote terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

By employing the techniques of this disclosure, a wireless communications device may offer the ease of connection and interoperability associated with a Bluetooth system at increased data rates while reducing conflicts with a coexisting WLAN system. As will be described below, information regarding the status of the WLAN system may be communicated to the Bluetooth system so that a Bluetooth link may be operated to better accommodate the status of the WLAN system.

To help illustrate the systems and methods of this disclosure, an exemplary wireless communication system 100 is shown in FIG. 1, including wireless communications device 102 having Bluetooth and WLAN capabilities. In this embodiment, wireless communications device 102 may form a Bluetooth communications link with wireless communications device 104, also having Bluetooth and WLAN capabilities. In one aspect, the Bluetooth communications link may employ a Bluetooth transceiver present in each device to drive communications using a spread-spectrum frequency hopping technique in the Industrial, Scientific and Medical (ISM) frequency band of 2.4 GHz. The Bluetooth protocol provides for a basic rate (BR), offering data transfer of up to approximately 1 Mbps or an enhanced data rate (EDR) of up to approximately 3 Mbps. Accordingly, a communications link formed between wireless communications devices 102 and 104 using Bluetooth transceivers may be referred to as a "BR/EDR" link.

To achieve higher throughput, the Bluetooth 3.0 protocol allows for delivery of Bluetooth information over the MAC and PHY layers of the WLAN transceivers of wireless communications devices 102 and 104. Under these conditions, the Bluetooth system may achieve data transfer rates of up to approximately 24 Mbps and this type of communications link formed between wireless communications devices 102 and 104 may be referred to as an "AMP" link. The Bluetooth system may use the Bluetooth transceiver to perform most of the functions associated with establishing and implementing either type of link, including the device discovery operations, the formation of the initial connection, the configuration of the profiles being used by the Bluetooth system, and others. However, the Bluetooth system may utilize communications over the Bluetooth transceiver to establish an AMP link between the respective WLAN transceivers of wireless communications devices 102 and 104 when transport of data at increased rates is desired. Once the AMP link is established, the Bluetooth system may then route the Bluetooth data through the WLAN transceivers.

In addition to the AMP link, the WLAN transceiver of wireless communications device 102 may be in concurrent use for operations associated with the WLAN system independent of the Bluetooth system. For example, as shown in FIG. 1, wireless communications device 102 may be associated with access point 106 in an infrastructure WLAN. In other embodiments, wireless communications device 102 may employ the WLAN transceiver to form a connection with any other type of wireless communications device in any suitable network topology, including an ad hoc network or peer to peer protocol, such as WiFi Direct™. For the purposes of this disclosure, communications employing the WLAN transceiver that are not associated with a Bluetooth AMP link may be termed a "WLAN" link. By communicating the status of the WLAN link to the Bluetooth system, an AMP link may be configured to improve coexistence.

Figure 2:
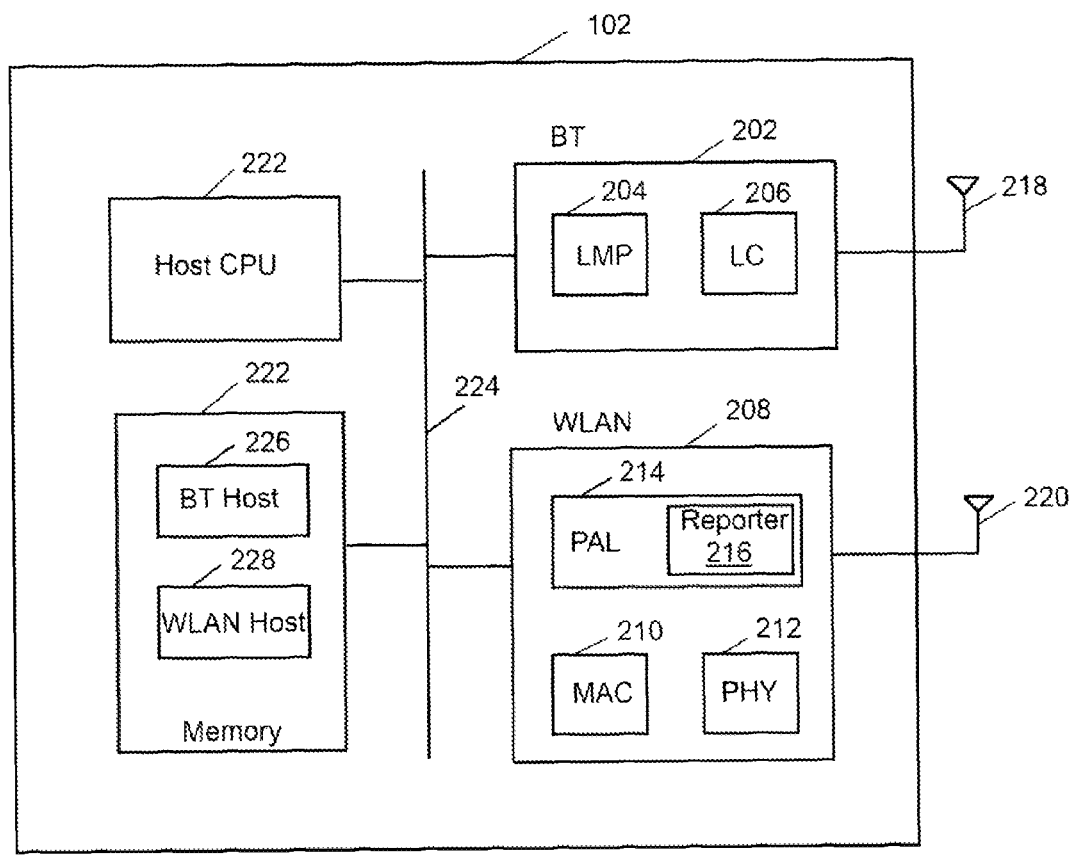
FIG. 2 schematically depicts functional blocks of a wireless communications device that coordinates operation of an AMP link based on a WLAN operational status, according to one embodiment of the invention.

Additional details regarding one embodiment of wireless communications device 102 are depicted as high level schematic blocks in FIG. 2. In some embodiments, wireless communications device 102 may employ an architecture in which the lower levels of the protocol stacks of the Bluetooth and WLAN systems are in firmware and hardware modules of the respective transceivers. As shown, Bluetooth transceiver 202 includes Link Manager Protocol (LMP) 204 for managing a Bluetooth link, such as a BR/EDR link between wireless communications devices 102 and 104, by performing advertisement, scanning, connection and security functions. Bluetooth transceiver 202 also includes Link Controller (LC) 206 for performing the hardware-specific transmission and reception of electronic signals. Likewise, WLAN transceiver 208 includes media access controller (MAC) 210 that may perform functions related to the handling and processing of (as defined in IEEE 802.11 standards) frames of data including verification, acknowledgment, routing, formatting and the like. Incoming and outgoing frames are exchanged between MAC 210 and physical layer (PHY) 212, which as shown here includes the functions of modulating the frames according to a relevant IEEE 802.11 standard defined protocol as well as providing the analog processing and RF conversion necessary to provide transmission and reception of wireless signals.

WLAN transceiver 208 may also include protocol adaptation layer (PAL) 214 to coordinate the exchange of information between upper layers of the Bluetooth protocol stack and MAC 210 and PHY 212. Additionally, PAL 214 may include a reporter 216 configured to communicate information regarding the operational status of WLAN transceiver 208 to the Bluetooth system, as described below.

In the depicted embodiment, Bluetooth transceiver 202 and WLAN transceiver 208 each have an associated antenna, antennas 218 and 220, respectively. As desired, one or more antennas may be shared between the transceivers using switching techniques known in the art. In some embodiments, some or all elements of Bluetooth transceiver 202 and WLAN transceiver 208 may be collocated on a common system, e.g., on the same circuit board or on distinct circuit boards within the same system, or may be embedded on the same integrated circuit as in a system on a chip (SoC) implementation.

Wireless communications device 102 also includes host CPU 222 configured to perform the various computations and operations involved with the functioning of wireless communications device 102. Host CPU 222 is coupled to Bluetooth transceiver 202 and WLAN transceiver 208 through bus 224, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. In particular, bus 224 may be configured to implement the functionality associated with a Bluetooth host controller interface (HCI). Upper layers of the protocol stacks of the Bluetooth and WLAN systems are generally implemented in software as Bluetooth host 226 and WLAN host 228 stored in memory 230, which may be accessed by host CPU 222 over bus 224.

Figure 3:
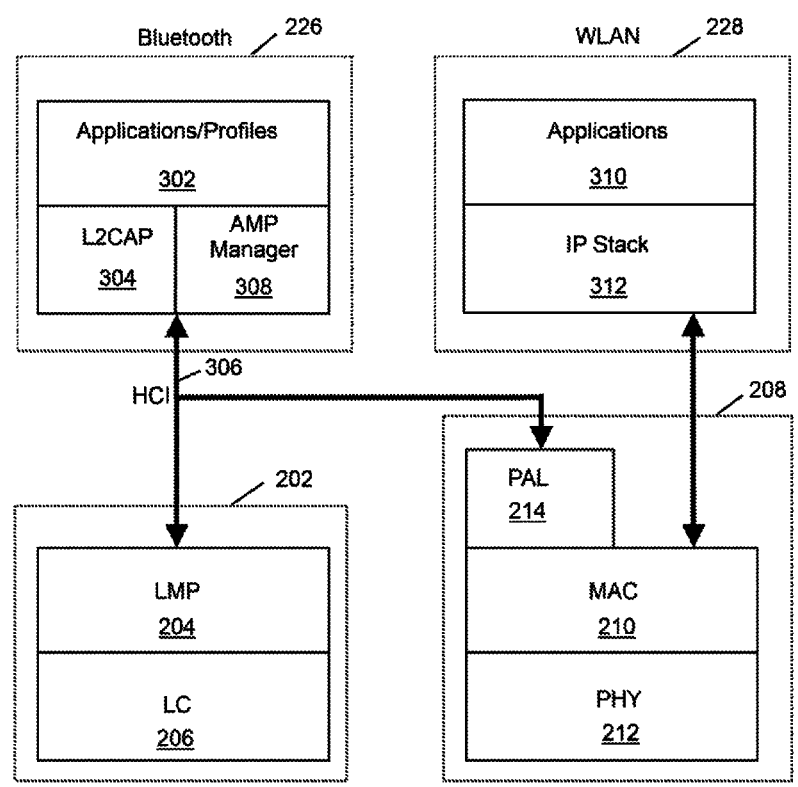
FIG. 3 represents portions of Bluetooth and WLAN stacks incorporating an AMP link.

Turning now to FIG. 3, a more detailed example representation of aspects of the Bluetooth protocol stack and WLAN stack are shown, particularly with regard to the logical division of the upper protocol layers implemented as software processes operating in host CPU 222 and the lower protocol layers implemented in Bluetooth transceiver 202 and WLAN transceiver 208. As shown, Bluetooth host 226 operating in host CPU 222 may include having application and profile layer 302 and a logical link control and adaptation protocol (L2CAP) layer 304 that provides multiplexing of data from the upper protocol layers and the formatting of packets. The packaged data is exchanged over HCI 306 with the lower layer protocols, LMP 204 and LC 206 of Bluetooth transceiver 202 for a BR/EDR link or through PAL 214 of WLAN transceiver 208 for an AMP link. Bluetooth host 226 may also include AMP manager 310 for creating and maintaining the AMP link through PAL 214. Correspondingly, WLAN host 228 may include application layer 312 and internet protocol (IP) stack 314. Packaged data may be exchanged between WLAN host 228 and the MAC 210 and PHY 212 layers of WLAN transceiver 208 without involvement of PAL 214. PAL 214 provides an interface layer between Bluetooth host 226 and WLAN transceiver 208. AMP manager 310 may call appropriate programming interfaces to initiate PAL 214. Correspondingly, PAL 214 may call appropriate programming interfaces in WLAN transceiver 208 to effect the commands from Bluetooth host 226.

According to some techniques of this disclosure, reporter 216 of PAL 214 may send information regarding an operational status of WLAN transceiver 208 to Bluetooth host 226. AMP manager 308 may in turn operate the AMP link based on the operational status of WLAN transceiver 208. In one aspect, PAL 214 may send a message defined by a suitable Bluetooth messaging specification. For example, the Bluetooth 3.0 specification establishes an event termed an AMP Status Change. The AMP Status Change even may occur at any time and may be identified by an event code, such as 0x4D. Parameters associated with the event are a Status parameter and an AMP Status parameter. An AMP_Status message with the Status parameter set to 0x00 may be used to indicate to Bluetooth host 226 that a change in status has occurred and the AMP_Status parameter may be used to provide information regarding the status change. As such, an AMP Status Change Event may involve the sending of an AMP_Status message having a variable value for the AMP_Status parameter.

AMP_Status parameter values as currently defined by the Bluetooth 3.0 specifications are given in Table 1.

TABLE 1

| AMP Status | Parameter Description |
|---|---|
| 0x00 | The Controller radio is available but is currently physically powered down. This value may be used if the AMP Controller is present and can be powered up by the AMP Manager. This value indicates that there may be a cost of time and power to use this AMP Controller (i.e., the time taken and power required to power up the AMP Controller). These costs are AMP type and AMP implementation dependant. |
| 0x01 | The AMP Controller is used by Bluetooth technology and might not be shared with other non-Bluetooth technologies. In one embodiment, this value is used only if the AMP Controller is powered up. This value might not indicate how much bandwidth is currently free on the AMP Controller. |
| 0x02 | The AMP Controller might have no capacity available for Bluetooth operation. In one embodiment, this value indicates that all of the AMP Controllers bandwidth is currently allocated to servicing a non Bluetooth technology. A device is permitted to create a Physical Link to an AMP Controller that has this status. |
| 0x03 | The AMP Controller might have low capacity available for Bluetooth operation. This value indicates that the majority of the AMP Controllers bandwidth is currently allocated to servicing a non Bluetooth technology. In one embodiment, an AMP Controller with capacity in the approximate range of 0 < capacity < 30% should indicate this value. This value does not indicate how much of the capacity available for Bluetooth operation is currently available. In some embodiments, this value is used only if the AMP Controller is powered up. |
| 0x04 | The AMP Controller might have medium capacity available for Bluetooth operation. In one embodiment, an AMP Controller with capacity in the approximate range of 30% < capacity < 70% should indicate this value. This value does not indicate how much of the capacity available for Bluetooth operation is currently available. In some embodiments, this value is used only if the AMP Controller is powered up. |
| 0x05 | The AMP Controller might have high capacity available for Bluetooth operation. In one embodiment, this value indicates that the majority of the AMP Controllers bandwidth is currently allocated to servicing the Bluetooth technology. An AMP Controller with capacity in the approximate range of 70% < capacity < 100% should indicate this value. This value does not indicate how much of the capacity available for Bluetooth operation is currently available. In some embodiments, this value shall only be used if the AMP Controller is powered up. |
| 0x06 | The AMP Controller might have full capacity available for Bluetooth operation. This value indicates that while |

TABLE 1-continued

| AMP Status | Parameter Description |
|---|---|
| | currently the AMP is only being used by Bluetooth, the device allows a different technology to share the radio. In one embodiment, this value shall be used by devices that are not capable of determining the current available capacity of an AMP that is shared by a different technology. This value does not indicate how much of the capacity available for Bluetooth operation is currently available. In some embodiments, this value shall only be used if the AMP Controller is powered up. |
| 0x07-0xFF | Reserved |

Reporter 216 may send an AMP_Status_Change message having a given AMP_Status value depending upon the operational status of WLAN transceiver 208. For example, operation of WLAN transceiver may involve scanning or roaming procedures, which may include WLAN transceiver 208 changing the wireless channel. However, changing channels may disrupt an AMP link established across the current channel. When there is an active AMP link on a given channel, concurrent operation may not be allowed as soon as the WLAN connection roams away from the current channel. By sending AMP_Status_Change message with the appropriate value, reporter 216 may coordinate operation of the WLAN and AMP links.

In one embodiment, reporter 216 may be configured to send an AMP_Status_Change message to Bluetooth host 226 having a first value, such as 0x02, indicating there is no current AMP capacity available through WLAN transceiver 208. This message may be sent before WLAN transceiver 208 moves to a different channel. Since any AMP link established on the current channel may be affected, AMP manager 308 may be configured to disable the AMP link upon receipt of the AMP_Status message having the first value and route any Bluetooth traffic through Bluetooth transceiver 202.

Figure 4:
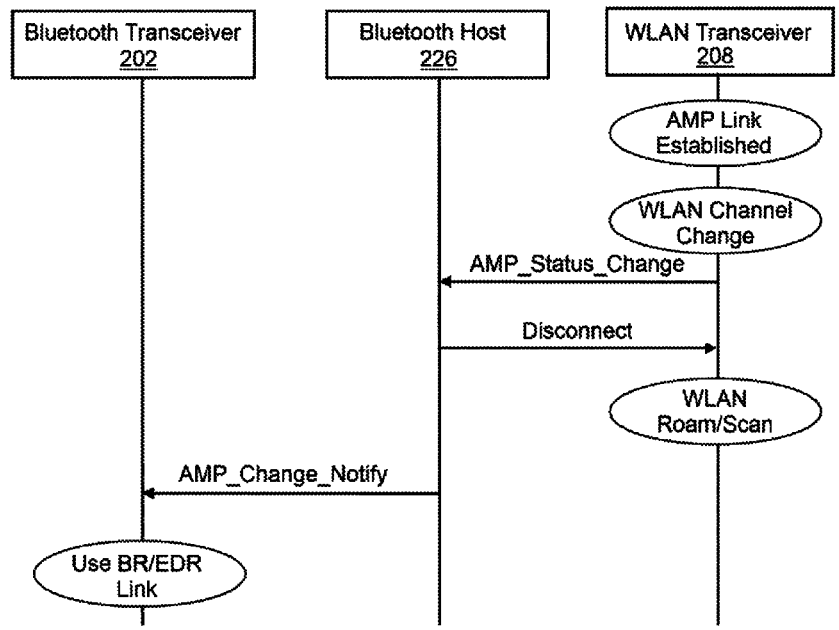
FIG. 4 depicts a sequence diagram showing disconnection of an AMP link in response to a WLAN channel change, according to one embodiment of the invention.

Coordination of the involved functional blocks is shown in the sequence diagram of FIG. 4. In this embodiment, an AMP link is established using WLAN transceiver 208 with another suitably configured device, such as wireless communications device 104. When WLAN transceiver 208 is preparing to undergo a channel change, such as in a scanning or roaming process, reporter 216 may determine there is a change in WLAN operational status and send an AMP_Status_Change message to Bluetooth host 226 with the first value. AMP manager 308 may receive the message and respond with a request to disconnect the AMP link, such as a Disconnect_Physical_Link_Req. WLAN transceiver 208 may then change channels as necessary. Bluetooth host 226 may also send a message to Bluetooth transceiver 202 to coordinate subsequent operations using the BR/EDR link. For example, Bluetooth host 226 may cause Bluetooth transceiver 202 to send an AMP_Change_Notify message to wireless communications device 104. Subsequent exchange of data may then continue through the BR/EDR link.

In another embodiment, reporter 216 may be configured to send an AMP_Status message to Bluetooth host 226 having a second value, such as 0x04 indicating there is medium AMP capacity available from the WLAN. This message may be sent after WLAN transceiver 208 has settled on a new channel, for example. Bluetooth host 226 may be configured to establish an AMP link on the new channel and route Bluetooth traffic over the AMP link upon receipt of this message.

Figure 5:
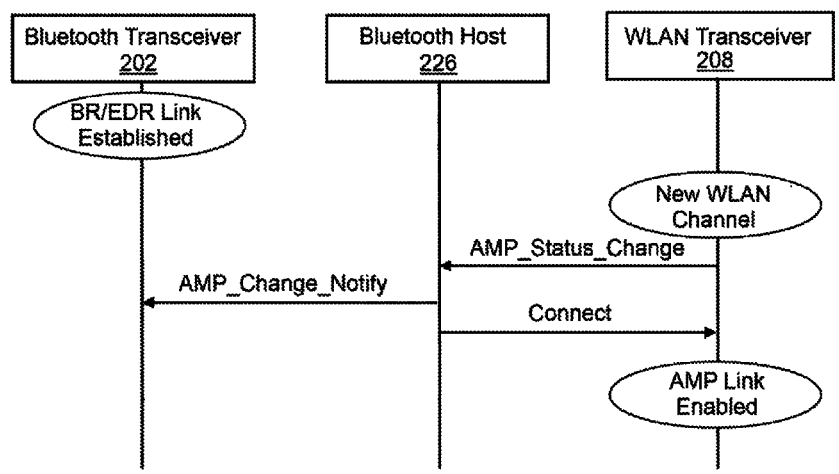
FIG. 5 depicts a sequence diagram showing establishment of an AMP link following a WLAN channel change, according to one embodiment of the invention.

Coordination of the involved functional blocks is shown in the sequence diagram of FIG. 5. A BR/EDR link is established using Bluetooth transceiver 202 with another suitably configured device, such as wireless communications device 104.

When WLAN transceiver 208 switches to a new channel, reporter 216 may be configured to determine there is a change in WLAN operational status and send an AMP_Status_Change message to Bluetooth host 226 with the second value. In response, Bluetooth host 226 may cause Bluetooth transceiver 202 to send an AMP_Change_Notify message to wireless communications device 104 to coordinate communications over an AMP link. AMP manager 308 may enable the AMP link through WLAN transceiver 208 over the new channel.

Wireless communications device 102 may also be configured to employ status information sent by reporter 216 contextually. For example, an AMP_Change_Notify message with the first value may be used to indicate an impending channel change involving WLAN transceiver 208. As described above, Bluetooth host 226 may disconnect the AMP link and route traffic over the BR/EDR link so that Bluetooth communication may continue even when WLAN transceiver 208 changes channel. Correspondingly, reporter 216 may then send an AMP_Change_Notify message with the second value when WLAN transceiver 208 settles on a new channel. When Bluetooth host 226 receives the message with the second value subsequently to receiving the message with the first value, Bluetooth host 226 may reestablish the AMP link on the new wireless channel as described above.

As desired, reporter 216 may be configured to utilize additional AMP_Status_Change messages as desired to communicate various other operational conditions of WLAN transceiver 208. For example, in another embodiment, reporter 216 may be configured to send an AMP_Status_Change message to Bluetooth host 226 having a third value, e.g., 0x06, indicating there is high AMP capacity available from WLAN transceiver 208. This message may be sent upon disconnection of a WLAN link, for example. Bluetooth host 226 may be configured to establish an AMP link on any suitable channel and route Bluetooth traffic over the AMP link upon receipt of this message. Other embodiments include sending AMP_Status_Change messages having different values that may be used to indicate different degrees of AMP capacity at WLAN transceiver 208, based upon its operational state. For example, an AMP_Status_Change message having a fourth value, e.g., 0x03, indicating low AMP capacity may be sent to grant the WLAN link priority, while still allowing usage of the AMP link. Upon receipt of the AMP_Status_Change message, Bluetooth host 226 may adjust usage of the AMP link, such as by configuring an acknowledgement algorithm in L2CAP 304.

Figure 6:
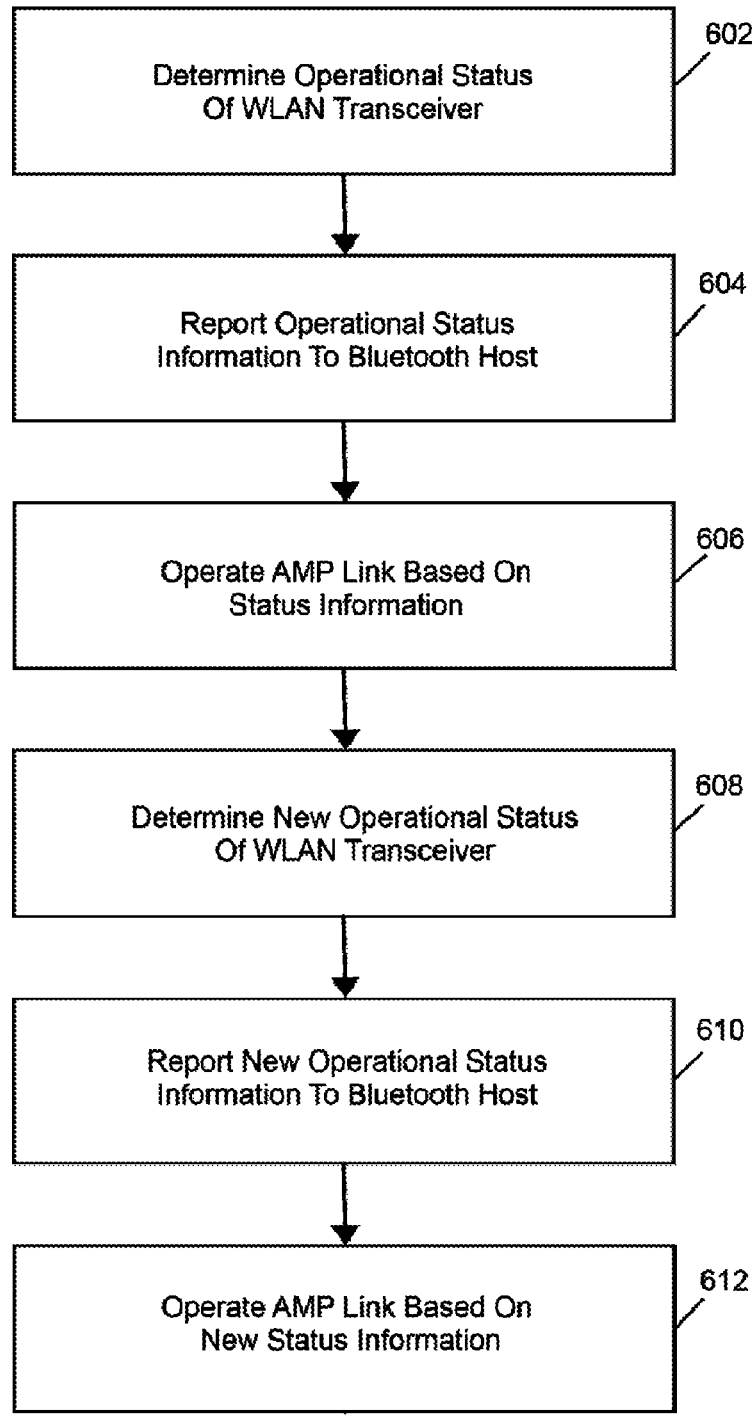
FIG. 6 is a flowchart showing an exemplary routine for operating an AMP link based on the information the operational status of a WLAN transceiver of the device, according to one embodiment of the invention.

One suitable example of the techniques of this disclosure for communicating WLAN link status to Bluetooth host 226 is represented by the flowchart of FIG. 6. Beginning with 602, reporter 216 may determine information regarding the operational status of WLAN transceiver 208 of wireless communications device 102. In 604, reporter 216 may send the information to Bluetooth host 226 through PAL 214. Based on the information, Bluetooth host 226 may then operate an AMP link of WLAN transceiver 208 in 606. In one aspect, the operational status may indicate an impending channel switch such that Bluetooth host 226 may disconnect the AMP link of the device. As desired, reporter 216 may determine new information corresponding to a subsequent operational status of WLAN transceiver 208 (608). For example, WLAN transceiver 208 may complete a channel switch to a new channel. Proceeding to 610, reporter 216 may send the new information to Bluetooth host 226 so that Bluetooth host 226 may operate the AMP link accordingly in 612, such as by establishing an AMP link on the new channel.

Described herein are presently preferred embodiments. However, one skilled in the art that pertains to the present invention will understand that the principles of this disclosure can be extended easily with appropriate modifications to other applications.

What is claimed is:

1. A wireless communication device comprising:
   a Bluetooth transceiver;
   a wireless local area network (WLAN) transceiver including a protocol adaptation layer (PAL) to support a Bluetooth alternate media access control/physical layer (AMP) link;
   a Bluetooth host to communicate with the WLAN transceiver through the PAL; and
   a reporter to send information regarding a WLAN operational status of the WLAN transceiver to the Bluetooth host, wherein the Bluetooth host to determine AMP link capacity from the operational status information and adjust operation of an AMP link based at least in part on the determined AMP link capacity.

2. The device of claim 1, wherein the operational status information comprises an AMP_Status_Change message sent by the reporter to the Bluetooth host.

3. The device of claim 2, wherein the AMP_Status_Change message has a first value indicating the WLAN transceiver has no AMP capacity, wherein the Bluetooth host to disconnect the AMP link upon receipt of the AMP_Status_Change message.

4. The device of claim 3, wherein the Bluetooth host further to route Bluetooth traffic to the Bluetooth transceiver after the AMP link is disconnected.

5. The device of claim 2, wherein the AMP_Status_Change message has a second value indicating the WLAN transceiver has medium AMP capacity, wherein the Bluetooth host to establish the AMP link over a channel being employed by the WLAN transceiver upon receipt of the AMP_Status_Change message.

6. The device of claim 3, wherein:
   the reporter further to:
   send a first AMP_Status_Change message with the first value based on an impending channel switch for the WLAN transceiver, and
   send a second AMP_Status_Change message with a second value when the WLAN transceiver switches to a new channel,
   the second value indicates the WLAN transceiver has medium AMP capacity, and
   the Bluetooth host to establish an AMP link over the new channel upon receipt of the second AMP_Status_Change message.

7. The device of claim 2, wherein the AMP_Status_Change message has a third value indicating the WLAN transceiver has high AMP capacity, wherein the Bluetooth host to establish the AMP link upon receipt of the AMP_Status_Change message.

8. The device of claim 2, wherein the AMP_Status_Change message has a fourth value indicating the WLAN transceiver has a predefined AMP capacity, wherein the Bluetooth host to adjust the AMP link upon receipt of the AMP_Status_Change message.

9. A method for wireless communications in a device having Bluetooth and wireless local area network (WLAN) capabilities, comprising:
   determining information regarding an operational status of a WLAN transceiver of the device;
   reporting the information to a Bluetooth host of the device through a protocol adaptation layer (PAL) of the WLAN transceiver;
   determining AMP link capacity from the operational status information; and
   adjusting operation of a Bluetooth alternate media access control/physical layer (AMP) link based at least in part on the determined AMP link capacity.

10. The method of claim 9, wherein the operational status information comprises an AMP_Status_Change message sent to the Bluetooth host.

11. The method of claim 10, wherein the AMP_Status_Change message has a first value, wherein the first value indicates the WLAN transceiver has no AMP capacity and wherein operating the AMP link comprises disconnecting the AMP link.

12. The method of claim 11, further comprising routing Bluetooth traffic to a Bluetooth transceiver of the device after the AMP link is disconnected.

13. The method of claim 10, wherein the AMP_Status_Change message has a second value, wherein the second value indicates the WLAN transceiver has medium AMP capacity and wherein operating the AMP link comprises establishing the AMP link over a channel being employed by the WLAN transceiver.

14. The method of claim 11, wherein the first AMP_Status_Change message with the first value is reported based on an impending channel switch for the WLAN transceiver, further comprising:
   reporting a second AMP_Status_Change message with a second value when the WLAN transceiver switches to a new channel, wherein the second value indicates the WLAN transceiver has medium AMP capacity; and
   establishing an AMP link over the new channel.

15. The method of claim 10, wherein the AMP_Status_Change message has a third value, wherein the third value indicates the WLAN transceiver has high AMP capacity and wherein operating the AMP link comprises establishing an AMP link.

16. The method of claim 10, wherein the AMP_Status_Change message has a fourth value, wherein the fourth value indicates the WLAN transceiver has a predefined AMP capacity and wherein operating the AMP link comprises adjusting the AMP link.

17. A non-transitory processor-readable storage medium for operating a wireless communications device having Bluetooth and wireless local area network (WLAN) capabilities, the processor-readable storage medium having instructions thereon, the instructions comprising:
   code for determining information regarding an operational status of a WLAN transceiver of the device;
   code for reporting the information to a Bluetooth host of the device through a protocol adaptation layer (PAL) of the WLAN transceiver;
   code for determining AMP link capacity from the operational status information; and
   code for adjusting operation of a Bluetooth alternate media access control/physical layer (AMP) link based at least in part on the determined AMP link capacity.

18. The storage medium of claim 17, wherein the operational status information comprises an AMP_Status_Change message sent to the Bluetooth host.

19. The storage medium of claim 18, wherein the AMP_Status_Change message has a first value, wherein the first value indicates the WLAN transceiver has no AMP capacity and wherein the code for operating the AMP link comprises code for disconnecting the AMP link.

20. The storage medium of claim 19, further comprising code for routing Bluetooth traffic to a Bluetooth transceiver of the device after the AMP link is disconnected.

21. The storage medium of claim 18, wherein the AMP_Status_Change message has a second value, wherein the second value indicates the WLAN transceiver has medium AMP capacity and wherein the code for operating the AMP link comprises code for establishing the AMP link over a channel being employed by the WLAN transceiver.

22. The storage medium of claim 19, wherein the first AMP_Status_Change message with the first value is reported based on an impending channel switch for the WLAN transceiver, further comprising:
    code for reporting a second AMP_Status_Change message with a second value when the WLAN transceiver switches to a new channel, wherein the second value indicates the WLAN transceiver has medium AMP capacity; and
    code for establishing an AMP link over the new channel.

23. The storage medium of claim 18, wherein the AMP_Status_Change message has a third value, wherein the third value indicates the WLAN transceiver has high AMP capacity and wherein the code for operating the AMP link comprises code for establishing an AMP link.

24. The storage medium of claim 18, wherein the AMP_Status_Change message has a fourth value, wherein the fourth value indicates the WLAN transceiver has a predefined AMP capacity and wherein the code for operating the AMP link comprises code for adjusting the AMP link.

25. A wireless communication device comprising:
    a Bluetooth transceiver;
    a wireless local area network (WLAN) transceiver including a protocol adaptation layer (PAL) to support a Bluetooth alternate media access control/physical layer (AMP) link;
    means for operating an AMP link in communication with the WLAN transceiver through the PAL;
    means for reporting information regarding a WLAN operational status of the WLAN transceiver to the means for operating the AMP link; and
    means for determining AMP link capacity from the operational status information,
    wherein the means for operating the AMP link to adjust operation of the AMP link based at least in part on the determined AMP link capacity.

26. The device of claim 25, wherein the operational status information comprises a AMP_Status_Change message sent by the means for reporting information to the means for operating the AMP link.

27. The device of claim 26, wherein the AMP_Status_Change message has a first value indicating the WLAN transceiver has no AMP capacity, wherein the means for operating the AMP link to disconnect the AMP link upon receipt of the AMP_Status_Change message.

28. The device of claim 27, wherein the means for operating the AMP link further to route Bluetooth traffic to the Bluetooth transceiver after the AMP link is disconnected.

29. The device of claim 26, wherein the AMP_Status_Change message has a second value indicating the WLAN transceiver has medium AMP capacity, wherein the means for operating the AMP link to establish the AMP link over a channel being employed by the WLAN transceiver upon receipt of the AMP_Status_Change message.

30. The device of claim 27, wherein:
    the means for reporting information further to:
    send a first AMP_Status_Change message with the first value based on an impending channel switch for the WLAN transceiver, and
    send a second AMP_Status_Change message with a second value when the WLAN transceiver switches to a new channel, the second value indicates the WLAN transceiver has medium AMP capacity, and
    the means for operating the AMP link to establish an AMP link over the new channel upon receipt of the second AMP_Status_Change message.

31. The device of claim 26, wherein the AMP_Status_Change message has a third value indicating the WLAN transceiver has high AMP capacity, wherein the means for operating the AMP link to establish the AMP link upon receipt of the AMP_Status_Change message.

32. The device of claim 26, wherein the AMP_Status_Change message has a fourth value indicating the WLAN transceiver has a predefined AMP capacity, wherein the means for operating the AMP link to adjust the AMP link upon receipt of the AMP_Status_Change message.

* * * * *